United States Patent
Tsai (10) Patent No.: US 9,346,178 B2
(45) Date of Patent: May 24, 2016

(54) SNIPS OPERABLE BY A SINGLE HAND (71) Applicant: Wen-Chiao Tsai, Taichung (TW)

(72) Inventor: Wen-Chiao Tsai, Taichung (TW)

(*) Notice: Subject to any disclaimer, the term of this patent is extended or adjusted under 35 U.S.C. 154(b) by 111 days.

(21) Appl. No.: 14/273,622

(22) Filed: May 9, 2014

(65) Prior Publication Data
US 2015/0321364 A1    Nov. 12, 2015

(51) Int. Cl.
*B26B 13/28*   (2006.01)
*B26B 13/16*   (2006.01)
*A01G 3/02*    (2006.01)
*B25B 7/14*    (2006.01)

(52) U.S. Cl.
CPC .............. *B26B 13/28* (2013.01); *A01G 3/021* (2013.01); *B25B 7/14* (2013.01); *B26B 13/16* (2013.01)

(58) Field of Classification Search
CPC ............ A01G 3/021; B25B 7/06; B25B 7/14; B26B 13/16; B26B 13/28
See application file for complete search history.

(56) References Cited

U.S. PATENT DOCUMENTS

| | | | | |
|---|---|---|---|---|
| 309,889 A * | 12/1884 | Shepard | .................. | B26B 13/16 30/262 |
| 3,416,226 A * | 12/1968 | Pfaffenbach | ............. | A01G 3/02 30/261 |
| 4,073,059 A * | 2/1978 | Wallace | .................. | B26B 13/14 30/261 |
| 6,189,219 B1 | 2/2001 | Mock | | |
| 6,301,787 B2 * | 10/2001 | Mock | .............................. | 30/252 |
| 6,574,870 B1 * | 6/2003 | Huang | ................... | B23D 29/02 30/252 |
| 8,079,150 B2 * | 12/2011 | Huang | ..................... | A01G 3/02 30/254 |
| 8,713,805 B2 * | 5/2014 | Schneider | ............... | B26B 13/16 30/244 |
| 8,950,075 B2 * | 2/2015 | Huang | ................... | B26B 13/26 30/252 |
| 9,003,667 B2 * | 4/2015 | Huang | ..................... | A01G 3/02 30/254 |
| 2009/0113721 A1 * | 5/2009 | Robinson | .................. | B25B 7/00 30/194 |
| 2012/0023756 A1 * | 2/2012 | Schneider | ............... | B26B 13/16 30/254 |
| 2013/0232797 A1 * | 9/2013 | Huang | ................... | B26B 13/26 30/252 |
| 2014/0360024 A1 * | 12/2014 | Schneider | ............... | B26B 13/28 30/252 |

* cited by examiner

*Primary Examiner* — Hwei C Payer
(74) *Attorney, Agent, or Firm* — Alan D. Kamrath; Kamrath IP Lawfirm, P.A.

(57) ABSTRACT

Snips include first and second handles pivotably connected to each other. Each of a pair of cutting members includes a connecting end and a cutting end. The connecting ends of the cutting members are respectively connected to distal ends of the first and second handles. A latch is pivotably mounted to the second handle and extends through a through-hole in the second handle. When the latch is in a locking position, a protrusion of the latch is located in a first section of the through-hole, a hook of the latch engages with a limiting member on the first handle, and the first handle is not pivotable relative to the second handle. When the latch is in the release position, the protrusion is located in a second section of the through-hole, the hook disengages from the limiting member, and the first handle is pivotable relative to the second handle.

9 Claims, 8 Drawing Sheets

SNIPS OPERABLE BY A SINGLE HAND

BACKGROUND

The present invention relates to snips and, more particularly, to snips operable by a single hand to switch between a locking position and a release position.

U.S. Pat. No. 6,189,219 discloses multiple purpose compound action snips including a pair of handles mutually connected at a handle pivot and a pair of cutting blades connected to the handles. The blades are respectively attached to distal portions of the handles by two bolts. A latch is mounted to one of the bolts and can be engaged with the other bolt. The snips are in a closed position not allowing pivotal movement of the handles about the handle pivot when the latch engages with the other bolt. On the other hand, the snips are in an open position allowing pivotal movement of the handles about the handle pivot to permit the cutting blades to perform a cutting operation when the latch disengages from the other bolt.

However, a user must hold the handles with one hand and engage the latch with the other bolt with the other hand to switch the snips to the closed position while using the snips. Thus, the snips must be operated with both hands to switch between the open position and the closed position, causing inconvenience to the user.

Thus, a need exists for novel snips to mitigate and/or obviate the above disadvantages.

BRIEF SUMMARY

This need and other problems in the field of easy operations of snips are solved by snips including a first handle having a first distal end and a first grip end respectively on two opposite ends of the first handle. A second handle includes a second distal end, a second grip end, and a through-hole located between the second distal end and the second grip end. The through-hole includes a first section and a second section respectively on two ends of the through-hole. The first section and the second section are connected to each other. The second section is located between the first section and the second distal end. A pivotal device extends through the first distal end of the first handle and the second distal end of the second handle, pivotably connecting the first handle to the second handle. Each of a pair of cutting members includes a connecting end and a cutting end respectively on two opposite ends of one of the pair of cutting members. The connecting ends of the pair of cutting members are respectively connected to the first distal end of the first handle and the second distal end of the second handle. A limiting member extends through the first handle. A latch is pivotably mounted to the second handle and extends through the through-hole. The latch is pivotable relative to the second handle between a locking position and a release position. The latch includes a protrusion and a hook respectively on two opposite ends of the latch. The protrusion is exposed outside the through-hole and is movable between the first section and the second section. The hook is releasably engageable with the limiting member.

When the latch is in the locking position, the protrusion is located in the first section of the through-hole, the hook engages with the limiting member, and the first handle is not pivotable relative to the second handle.

On the other hand, when the latch is in the release position, the protrusion is located in the second section of the through-hole, the hook disengages from the limiting member, and the first handle is pivotable relative to the second handle.

The snips can further include a positioning device mounted to the latch. The positioning device includes a positioning button and a biasing member. The positioning button is slideably mounted to the protrusion of the latch. The biasing member is mounted between the positioning button and the latch.

In an example, the latch includes a body located between the protrusion and the hook. The protrusion has a first length in a length direction. The body has a second length in the length direction larger than the first length.

In the example, the body of the latch includes an end adjacent to the protrusion. The end of the body includes at least one abutment face. The positioning button includes a pressing portion, a bottom, and a coupling hole. The pressing portion and the bottom are respectively located on two opposite ends of the positioning button. The coupling hole extends from an end face of the bottom towards the pressing portion. The protrusion is received in the coupling hole. The biasing member is mounted around the protrusion of the latch and presses against the at least one abutment face of the body.

In the example, the positioning button further includes a positioning portion between the pressing portion and the bottom. The first section of the through-hole has a first width in a width direction perpendicular to the length direction. The second section of the through-hole has a second width in the width direction smaller than the first width. The positioning portion of the positioning button is in the first section of the through-hole when the latch is in the locking position. The positioning portion of the positioning button is in the second section of the through-hole when the latch is in the release position.

In the example, the positioning portion of the positioning button has a third width in the width direction equal to the first width of the first section. The pressing portion of the positioning button has a fourth width in the width direction equal to the second width of the second section.

In the example, each of the protrusion and the body of the latch has rectangular cross sections perpendicular to a height direction that is perpendicular to the length and width directions. Each of the pressing portion, the bottom, the coupling hole, and the positioning portion of the positioning button has rectangular cross sections perpendicular to the height direction. The biasing member has rectangular cross sections perpendicular to the height direction and corresponding to the cross sections of the protrusion of the latch.

The snips can further include an axle and a spring. The latch further includes a through-hole between the protrusion and the body. The axle extends through the second handle, the spring, and the through-hole of the latch, pivotably connecting the latch to the second handle.

The snips can further include a return spring between the connecting ends of the cutting members. The cutting members are pivotably connected to each other by a pivot.

In the example, the connecting end of one of the cutting members is connected to the first distal end of the first handle by a fastener and a nut. The connecting end of the other cutting member is connected to and the second distal end of the second handle by another fastener and another nut.

Illustrative embodiments will become clearer in light of the following detailed description described in connection with the drawings.

DESCRIPTION OF THE DRAWINGS

The illustrative embodiments may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

DETAILED DESCRIPTION

Figure 1:
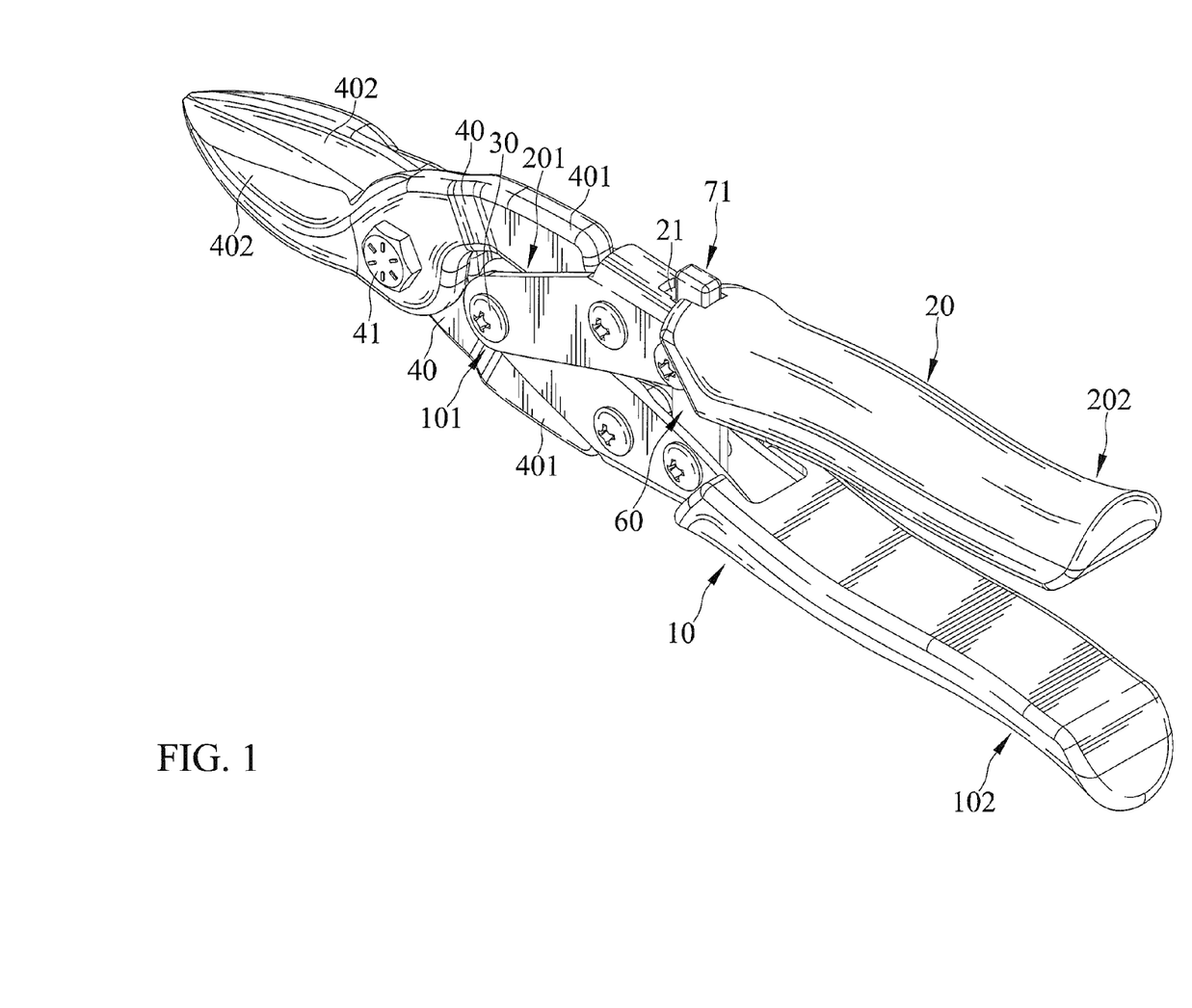
FIG. 1 is a perspective view of snips operable by a single hand according to the present invention.
Figure 2:
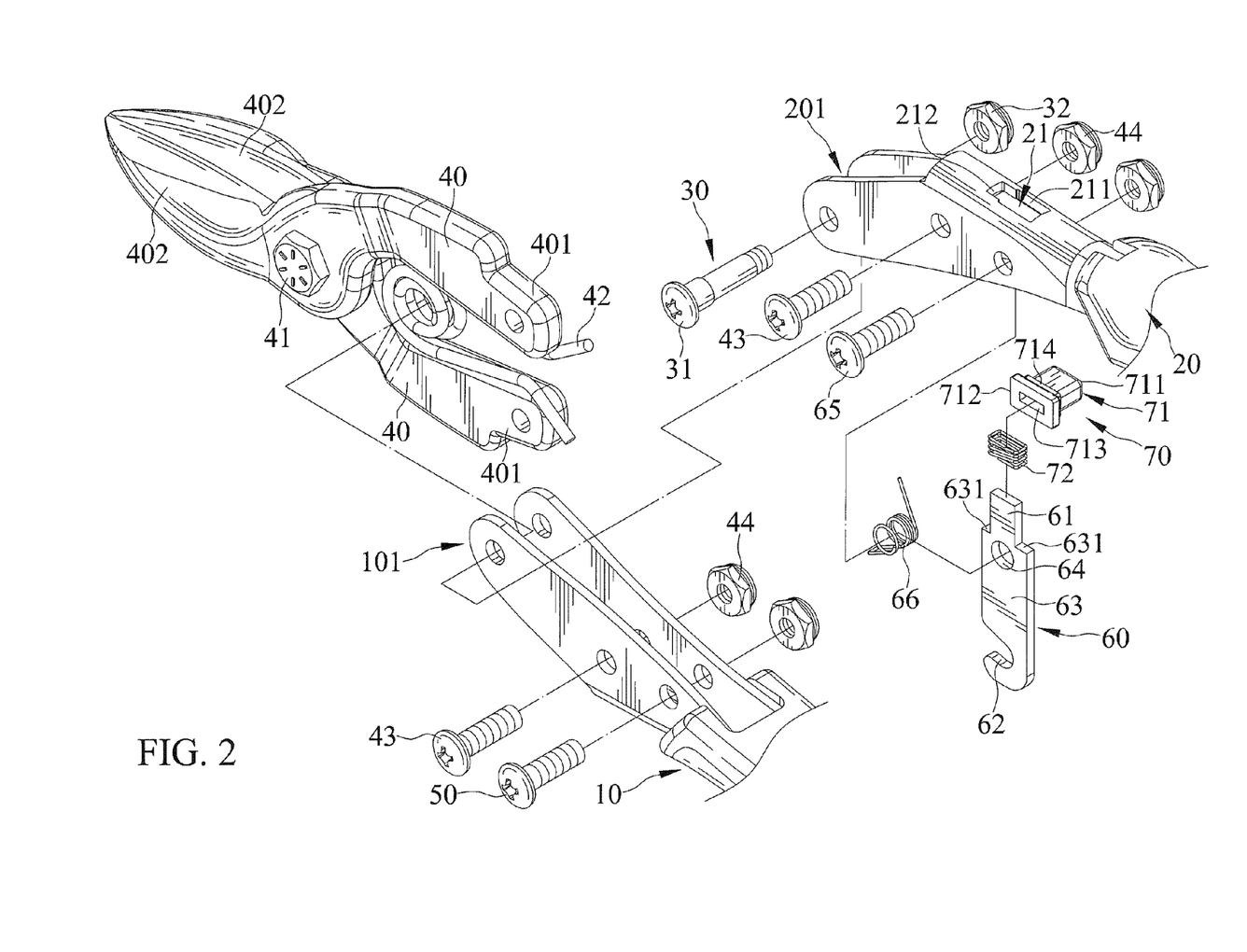
FIG. 2 is a partial, exploded, perspective view of the snips of FIG. 1.
Figure 3:
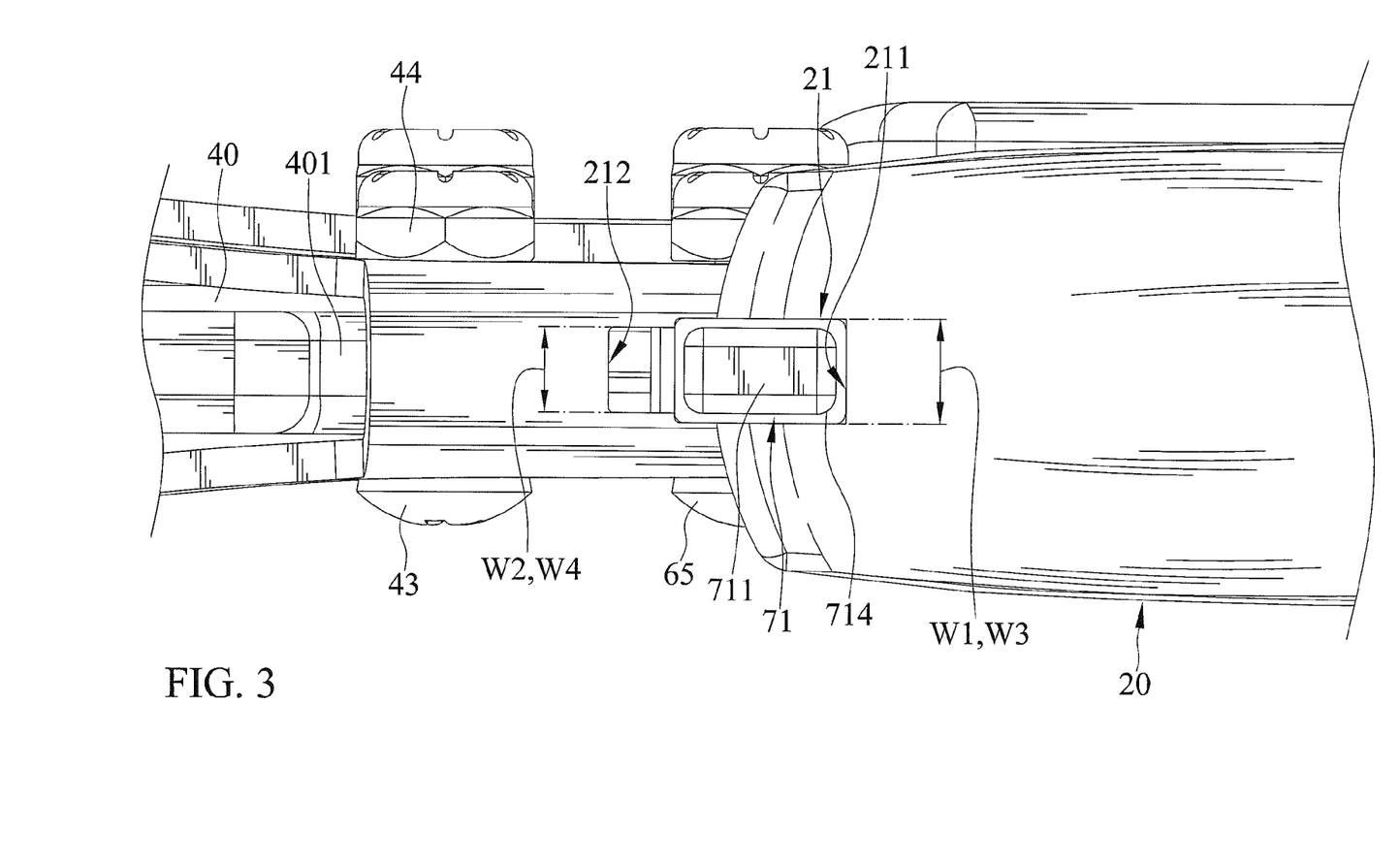
FIG. 3 is a partial, top view of the snips of FIG. 1.
Figure 4:
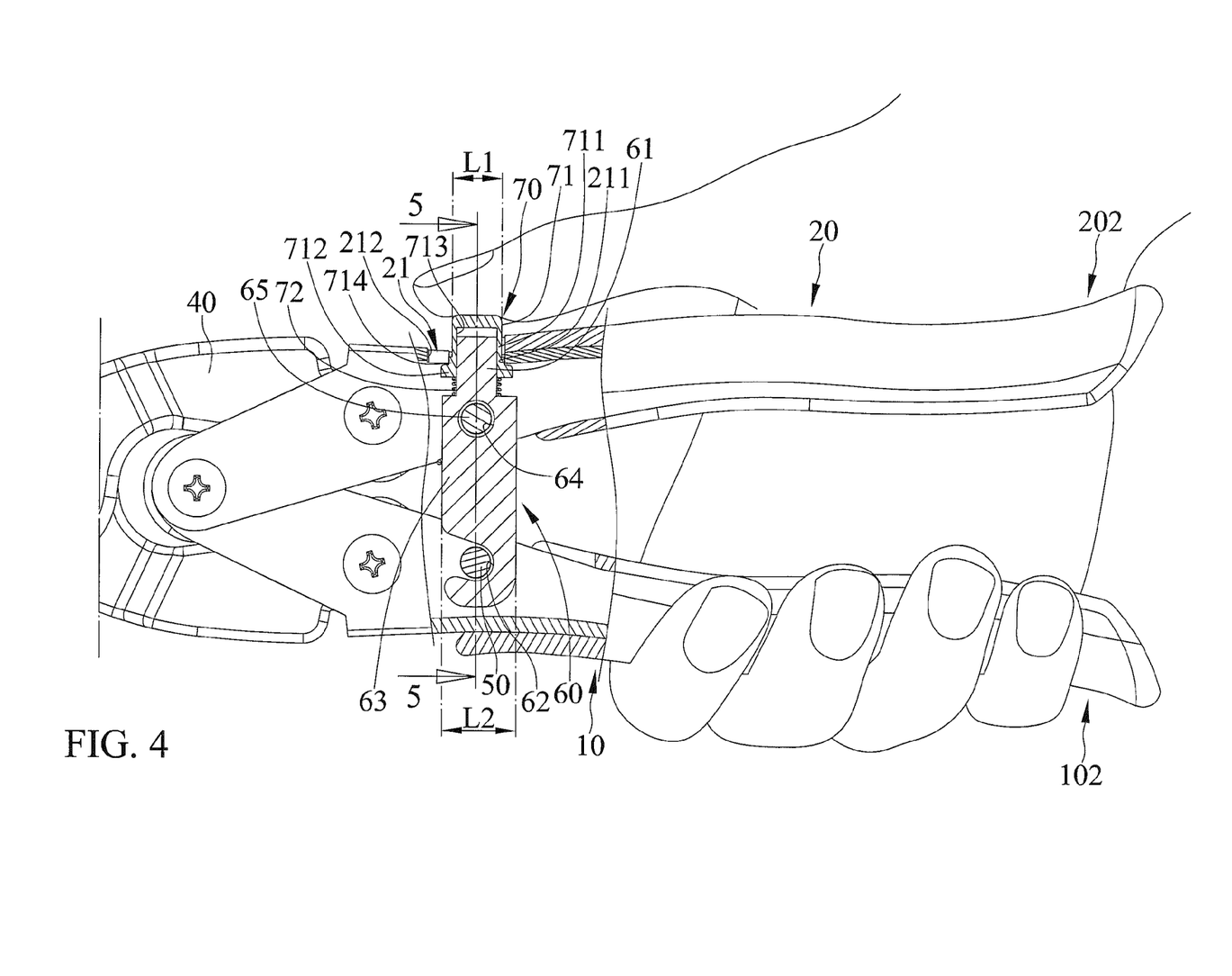
FIG. 4 is a partially cross-sectioned side view of the snips of FIG. 1, illustrating holding the snips by a single hand while a latch is in a locking position.
Figure 5:
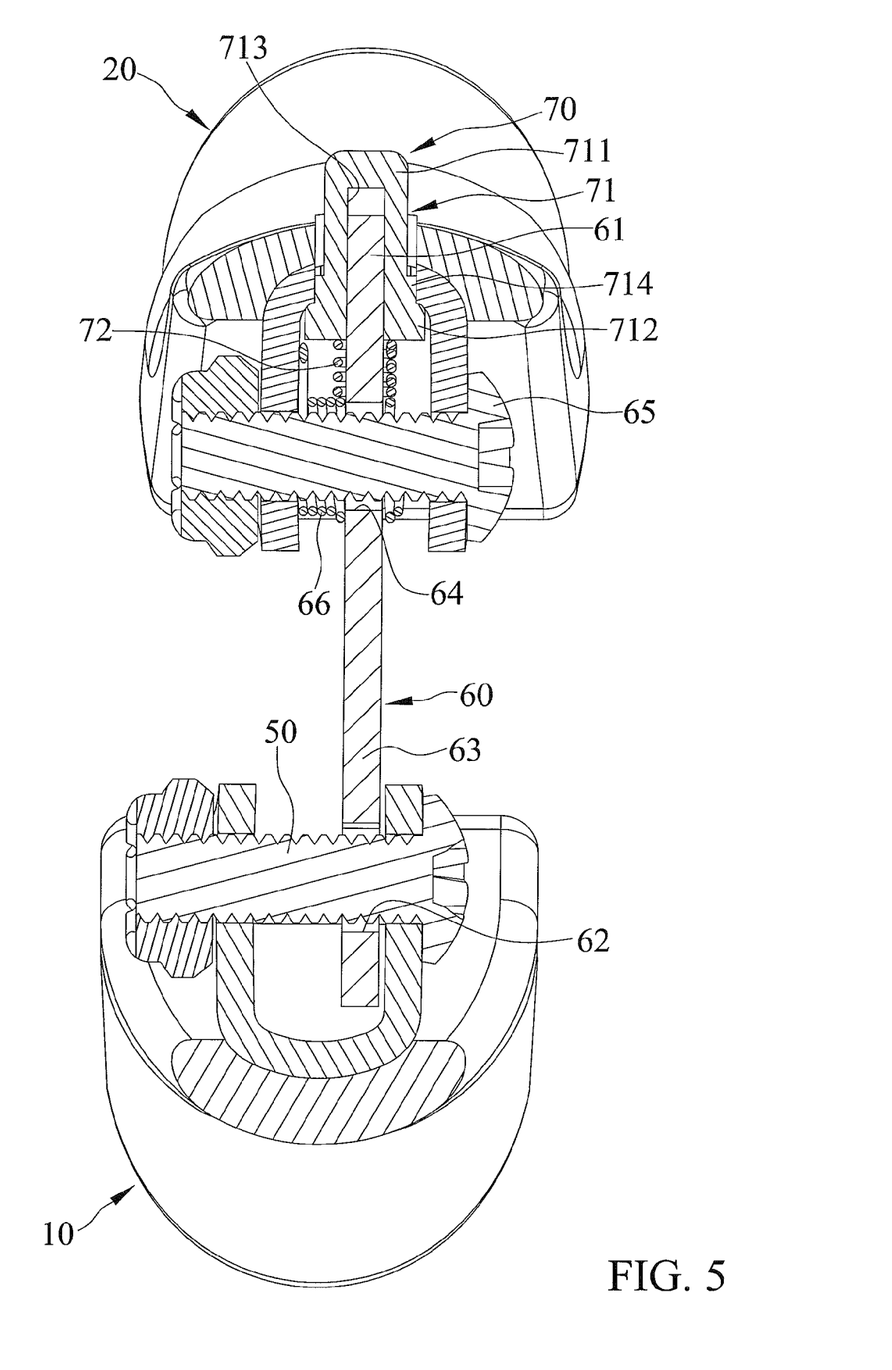
FIG. 5 is a cross sectional view taken along section line 5-5 of FIG. 4.
Figure 6:
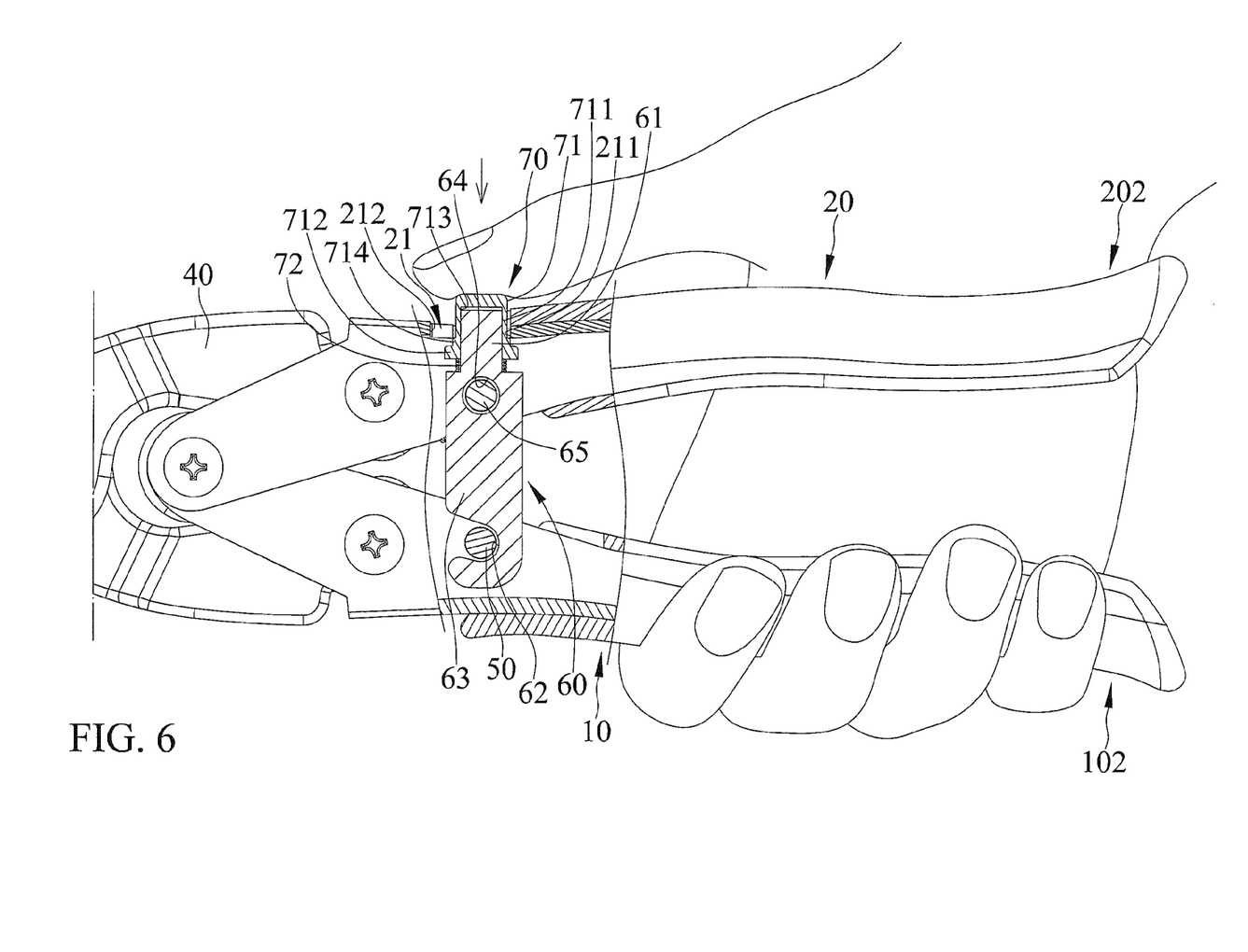
FIG. 6 is a view similar to FIG. 4, with a positioning button moved relative to a handle.
Figure 7:
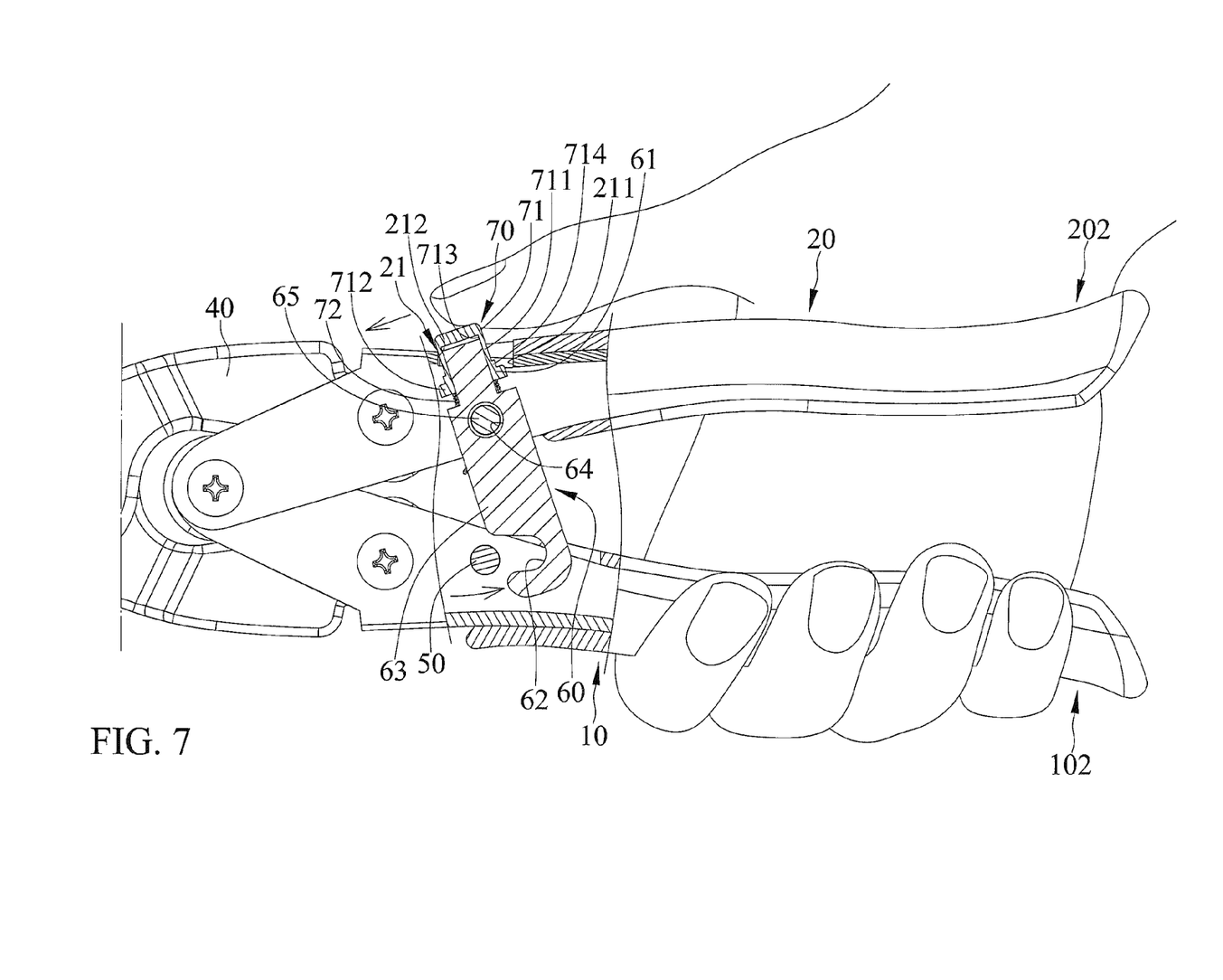
FIG. 7 is a view similar to FIG. 6, with the latch pivoted from the locking position to a release position.
Figure 8:
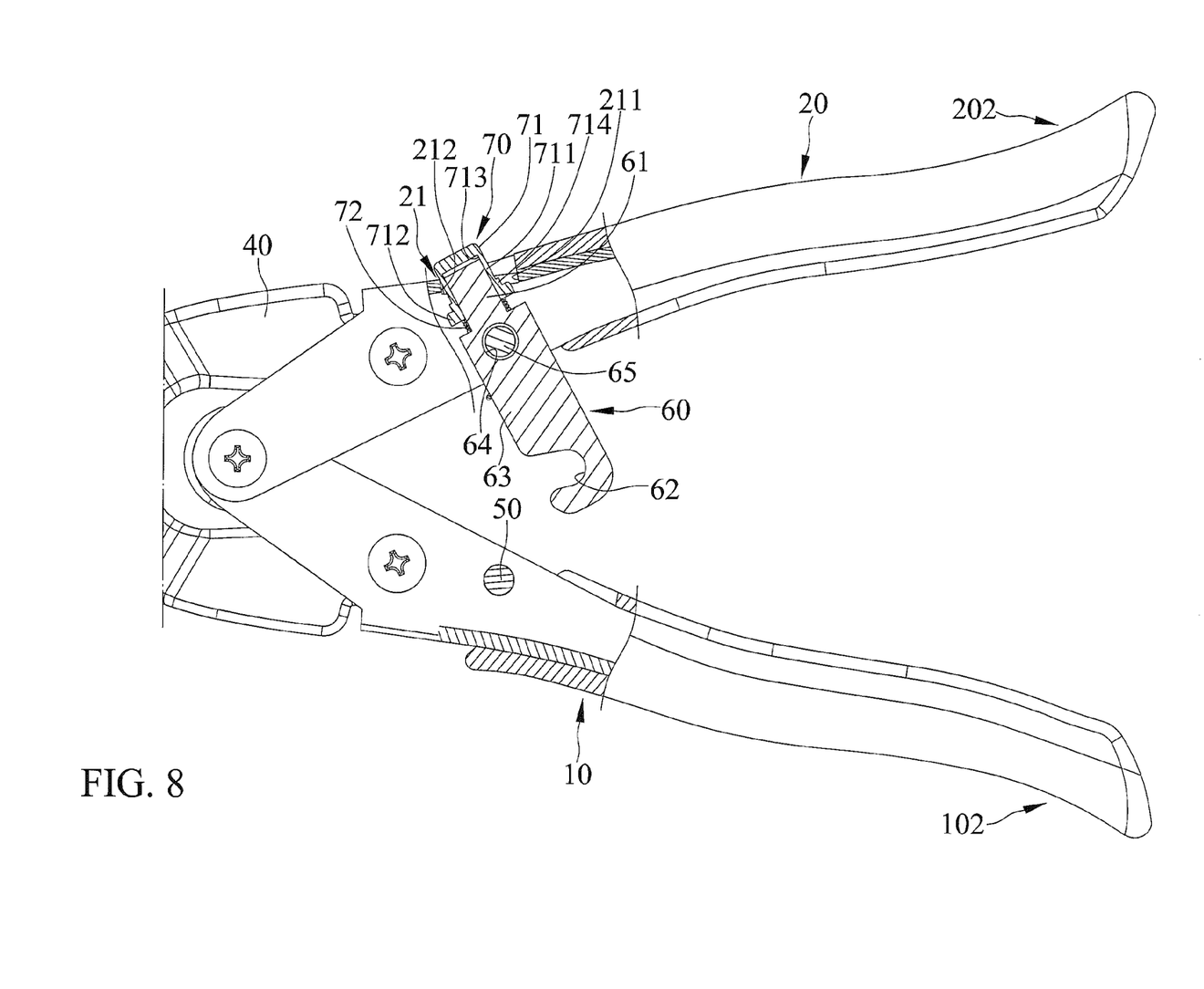
FIG. 8 is a view similar to FIG. 7, with two handles in an open position.

FIGS. 1-8 show snips operable by a single hand according to the present invention. According to the form shown, the snips includes a first handle 10, a second handle 20, a pivotal device 30, a pair of cutting members 40, a limiting member 50, a latch 60, and a positioning device 70. The first handle 10 and the second handle 20 are pivotably connected by the pivotal device 30 to switch between an open position and a closed position. The cutting members 40 are respectively connected to the first handle 10 and the second handle 20. The limiting member 50 extends through the first handle 10. The latch 60 is pivotably connected to the second handle 20 and is pivotable relative to the second handle 20 between a locking position and a release position under operation by a single hand of a user. When the latch 60 is in the locking position, the hook 62 engages with the limiting member 50, and the first handle 10 is not pivotable relative to the second handle 20. On the other hand, when the latch 60 is in the release position, the hook 62 disengages from the limiting member 50, and the first handle 10 is pivotable relative to the second handle 20 to actuate the cutting members 40 to proceed with a cutting operation. The positioning device 70 is mounted to the latch 60 to prevent undesired pivotable movement of the latch 60 relative to the second handle 20.

The first handle 10 includes a first distal end 101 and a first grip end 102 respectively on two opposite ends of the first handle 10.

The second handle 20 includes a second distal end 201, a second grip end 202, and a through-hole 21 located between the second distal end 201 and the second grip end 202. The through-hole 21 includes a first section 211 and a second section 212 respectively on two ends of the through-hole 21 spaced from each other in a length direction. The first section 211 and the second section 212 are connected to each other. The second section 212 is located between the first section 211 and the second distal end 201. The first section 211 of the through-hole 21 has a first width W1 in a width direction perpendicular to the length direction. The second section 212 of the through-hole 21 has a second width W2 in the width direction smaller than the first width W1.

The pivotal device 30 extends through the first distal end 101 of the first handle 10 and the second distal end 201 of the second handle 20, pivotably connecting the first handle 10 to the second handle 20. In the form shown, the pivotal device 30 includes a screw 31 and a nut 32 in threading connection with the screw 31.

The cutting members 40 are connected to each other by a pivot 41. Each cutting member 40 includes a connecting end 401 and a cutting end 402 respectively on two opposite ends of the cutting member 40 in the length direction. The connecting end 401 of one of the cutting members 40 is connected to the first distal end 101 of the first handle 10 by a fastener 43 and a nut 44. The connecting end 401 of the other cutting member 40 is connected to the second distal end 201 of the second handle 20 by another fastener 43 and another nut 44. A return spring 42 is mounted between the connecting ends 401 of the pair of cutting members 40. When the latch 60 is in the release position, the first handle 10 and the second handle 20 are normally in the open position under the action of the return spring 42. When the user presses the first grip end 102 of the first handle 10 and the second grip end 202 of the second handle 20, the first grip end 102 of the first handle 10 and the second grip end 202 of the second handle 20 switch from the open position to the closed position and move the cutting ends 402 of the cutting members 40 towards each other to cut an object.

The limiting member 50 is mounted to the first handle 10. In the embodiment, the limiting member 50 extends through the first handle 10. The limiting member 50 can be in the form of an axle, pin, screw, etc.

The latch 60 is pivotably mounted to the second handle 20 and extends through the through-hole 21 in the length direction. The latch 60 is pivotable relative to the second handle 20 between a locking position and a release position. The latch 60 includes a protrusion 61, a hook 62, a body 63, and a through-hole 64. The protrusion 61 and the hook 62 are respectively on two opposite ends of the latch 60 in a longitudinal direction of the latch 60. The protrusion 61 is exposed outside of the through-hole 21 and is movable between the first section 211 and the second section 212 in response to the pivotal movement of the latch 60 relative to the second handle 20. The hook 62 is releasably engageable with the limiting member 50. The body 63 is located between the protrusion 61 and the hook 62. The protrusion 61 has a first length L1 in the length direction. The body 63 has a second length L2 in the length direction larger than the first length L1. The body 63 of the latch 60 includes an end adjacent to the protrusion 61. The end of the body 63 includes at least one abutment face 631. In the form shown, the protrusion 61 is located in a middle portion of the body 63. Thus, the body 63 has two abutment faces 631 on two sides of the protrusion 61.

The latch 60 further includes a through-hole 64 between the protrusion 61 and the body 63. An axle 65 extends through the second handle 20, a spring 66, and the through-hole 64 of the latch 60, pivotably connecting the latch 60 to the second handle 20. An end of the spring 66 is attached to the body 63.

When the latch 60 is in the locking position, the protrusion 61 is located in the first section 211 of the through-hole 21, the hook 62 engages with the limiting member 50, and the first handle 10 is not pivotable relative to the second handle 20. On the other hand, when the latch 60 is in the release position, the protrusion 61 is located in the second section 212 of the through-hole 21, the hook 62 disengages from the limiting member 50, and the first handle 10 is pivotable relative to the second handle 20 to actuate the cutting members 40 to perform the cutting operation.

The positioning device 70 is mounted to the latch 60 and includes a positioning button 71 and a biasing member 72. The positioning button 71 is slideably mounted to the protrusion 61 of the latch 60. The biasing member 72 is mounted between the positioning button 71 and the latch 60. In the form shown, the biasing member 72 is a coil spring.

The positioning button 71 includes a pressing portion 711, a bottom 712, a coupling hole 713, and a positioning portion 714. The pressing portion 711 and the bottom 712 are respectively located on two opposite ends of the positioning button 71 in a longitudinal direction of the positioning button 71. An end of the pressing portion 711 opposite to the bottom 712 is adapted to be pressed by the user to cause sliding movement of the positioning button 71 relative to the protrusion 61 of the latch 60 in the longitudinal direction. The coupling hole 713 extends from an end face of the bottom 712 towards the pressing portion 711. The protrusion 61 of the latch 60 is received in the coupling hole 713. The positioning portion 714 is located between the pressing portion 711 and the bottom 712. The positioning portion 714 of the positioning button 71 is in the first section 211 of the through-hole 21 when the latch 60 is in the locking position. The positioning portion 714 of the positioning button 71 is in the second section 212 of the through-hole 21 when the latch 60 is in the release position.

The biasing member 72 is mounted around the protrusion 61 of the latch 60. Two opposite ends of the biasing member 72 respectively press against the end face of the bottom 712 and the abutment faces 631 of the body 63. Preferably, the positioning portion 714 of the positioning button 71 has a third width W3 in the width direction equal to the first width W1 of the first section 211. The pressing portion 711 of the positioning button 71 has a fourth width W4 in the width direction equal to the second width W2 of the second section 212.

In the form shown, each of the protrusion 61 and the body 63 of the latch 60 has rectangular cross sections perpendicular to a height direction that is perpendicular to the length and width directions. Each of the pressing portion 711, the bottom 712, the coupling hole 713, and the positioning portion 714 of the positioning button 71 has rectangular cross sections perpendicular to the height direction. The biasing member 72 has rectangular cross sections perpendicular the height direction and corresponding to the cross sections of the protrusion 61 of the latch 60.

When the latch 60 is in the locking position, the first grip end 102 of the first handle 10 and the second grip end 202 of the second handle 20 are close to each other and are in the closed position. The return spring 42 between the cutting members 40 is compressed by the fasteners 43. The positioning portion 714 of the positioning button 71 is in the first section 211 of the through-hole 21. Since the second width W2 of the second section 212 is smaller than the first width W1 of the first section 211 and the third width W3 of the positioning portion 714, the positioning portion 714 can only be positioned in the first section 211 of the through-hole 21 and can not move into the second section 212. Thus, the latch 60 can not pivot relative to the second handle 20, and the positioning button 71 is positioned in the first section 211 of the through-hole 21.

The user can grip the first grip end 102 of the first handle 10 and the second grip end 202 of the second handle 20 with a single hand. Furthermore, the user can press the end of the pressing portion 711 of the positioning button 71 opposite to the positioning portion 714 with the thumb of the single handle to cause the positioning button 71 to slide relative to the protrusion 61 of the latch 60 in the longitudinal direction. The bottom 712 of the positioning button 71 moves towards the abutment faces 631 of the body 63. The biasing member 72 is compressed by the end face of the bottom 712 and the abutment faces 631 of the body 63. In this case, the pressing portion 711 of the positioning button 71 is aligned with and located in the first section 211 of the through-hole 21. Since the fourth width W4 of the pressing portion 711 is equal to the second width W2 of the second section 212, the user can push the positioning button 71 in the length direction to move the pressing portion 711 into the second section 212. At the same time, the latch 60 pivots relative to the second handle 20 and moves from the locking position to the release position. The pressing portion 711 of the positioning button 71 is located in the second section 212 of the through-hole 21, and the hook 62 of the latch 60 disengages from the limiting member 50. The return spring 42 returns to its original position to move the first handle 10 and the second handle 20 away from each other. Furthermore, the first handle 10 and the second handle 20 can pivot relative to each other between the open position and the closed position to actuate the cutting members 40 to perform the cutting operation.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. Snips comprising:
   a first handle including a first distal end and a first grip end respectively on two opposite ends of the first handle;
   a second handle including a second distal end, a second grip end, and a through-hole located between the second distal end and the second grip end, with the through-hole including a first section and a second section respectively on two ends of the through-hole, with the first section and the second section connected to each other, with the second section located between the first section and the second distal end;
   a pivotal device extending through the first distal end of the first handle and the second distal end of the second handle, pivotably connecting the first handle to the second handle;
   a pair of cutting members, with each of the pair of cutting members including a connecting end and a cutting end respectively on two opposite ends of each of the pair of cutting members, with the connecting ends of the pair of cutting members respectively connected to the first distal end of the first handle and the second distal end of the second handle;
   a limiting member mounted to the first handle;
   a latch pivotably mounted to the second handle and extending through the through-hole, with the latch pivotable relative to the second handle between a locking position and a release position, with the latch including a protrusion and a hook respectively on two opposite ends of the latch, with the protrusion exposed outside of the through-hole and movable between the first section and the second section, with the hook releasably engageable with the limiting member;
   wherein when the latch is in the locking position, the protrusion is located in the first section of the through-hole, the hook engages with the limiting member, and the first handle is not pivotable relative to the second handle;

wherein when the latch is in the release position, the protrusion is located in the second section of the through-hole, the hook disengages from the limiting member, and the first handle is pivotable relative to the second handle; and a positioning device mounted to the latch, with the positioning device including a positioning button and a biasing member, with the positioning button slideably mounted to the protrusion of the latch, and with the biasing member mounted between the positioning button and the latch.

2. The snips as claimed in claim 1, with the latch including a body located between the protrusion and the hook, with the protrusion having a first length in a length direction, with the body having a second length in the length direction larger than the first length.

3. The snips as claimed in claim 2, with the body of the latch including an end adjacent to the protrusion, with the end of the body including at least one abutment face, with the positioning button including a pressing portion, a bottom, and a coupling hole, with the pressing portion and the bottom respectively located on two opposite ends of the positioning button, with the coupling hole extending from an end face of the bottom towards the pressing portion, with the protrusion received in the coupling hole, with the biasing member mounted around the protrusion of the latch and pressing against the at least one abutment face of the body.

4. The snips as claimed in claim 3, with the positioning button further including a positioning portion between the pressing portion and the bottom, with the first section of the through-hole having a first width in a width direction perpendicular to the length direction, with the second section of the through-hole having a second width in the width direction smaller than the first width, wherein the positioning portion of the positioning button is in the first section of the through-hole when the latch is in the locking position, and wherein the positioning portion of the positioning button is in the second section of the through-hole when the latch is in the release position.

5. The snips as claimed in claim 4, with the positioning portion of the positioning button having a third width in the width direction equal to the first width of the first section, and with the pressing portion of the positioning button having a fourth width in the width direction equal to the second width of the second section.

6. The snips as claimed in claim 4, with each of the protrusion and the body of the latch having rectangular cross sections perpendicular to a height direction that is perpendicular to the length and width directions, with each of the pressing portion, the bottom, the coupling hole, and the positioning portion of the positioning button having rectangular cross sections perpendicular to the height direction, with the biasing member having rectangular cross sections perpendicular to the height direction and corresponding to the cross sections of the protrusion of the latch.

7. The snips as claimed in claim 4, further comprising: an axle and a spring, with the latch further including a through-hole between the protrusion and the body, with the axle extending through the second handle, the spring, and the through-hole of the latch, pivotably connecting the latch to the second handle.

8. The snips as claimed in claim 1, further comprising: a return spring between the connecting ends of the pair of cutting members, with the pair of the cutting members pivotably connected to each other by a pivot.

9. The snips as claimed in claim 8, with the connecting end of one of the pair of cutting members connected to the first distal end of the first handle by a fastener and a nut, and with the connecting end of the other of the pair of cutting members connected to the second distal end of the second handle by another fastener and another nut.

\* \* \* \* \*